United States Patent
Cahill et al.

(10) Patent No.: US 8,712,626 B2
(45) Date of Patent: Apr. 29, 2014

(54) AUTOBRAKE AND DECEL CONTROL BUILT-IN TEST EQUIPMENT

(75) Inventors: Eric D. Cahill, Troy, OH (US); Richard P. Metzger, Jr., Troy, OH (US)

(73) Assignee: Goodrich Corporation, Charlotte, NC (US)

(*) Notice: Subject to any disclaimer, the term of this patent is extended or adjusted under 35 U.S.C. 154(b) by 682 days.

(21) Appl. No.: 12/435,712

(22) Filed: May 5, 2009

(65) Prior Publication Data

US 2010/0286880 A1    Nov. 11, 2010

(51) Int. Cl.
*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl.
USPC ....... 701/29.1; 701/30.5; 701/31.1; 701/31.4; 701/70; 73/121

(58) Field of Classification Search
USPC ........ 701/29, 29.1, 30.5, 31, 31.7, 31.8, 32.5, 701/70, 71, 82, 29.4, 29.7, 29.8, 30.3, 30.8, 701/30.9, 31.1, 31.2, 31.4, 32.8, 33.5, 33.7, 701/33.8, 33.9, 34.1, 34.4; 73/121, 128
See application file for complete search history.

(56) References Cited

U.S. PATENT DOCUMENTS

| | | | | |
|---|---|---|---|---|
| 5,404,304 A | * | 4/1995 | Wise et al. | 700/304 |
| 5,493,495 A | * | 2/1996 | Naito et al. | 701/76 |
| 5,557,523 A | * | 9/1996 | Yeh et al. | 701/32.8 |
| 6,754,615 B1 | * | 6/2004 | Germann et al. | 703/8 |
| 7,269,762 B2 | * | 9/2007 | Heckmann et al. | 714/47.1 |
| 7,941,261 B2 | * | 5/2011 | Johnsen | 701/70 |
| 2001/0022470 A1 | * | 9/2001 | Dunning et al. | 303/186 |
| 2004/0107082 A1 | * | 6/2004 | Sato et al. | 703/8 |
| 2007/0179696 A1 | * | 8/2007 | Schoeggl | 701/69 |
| 2008/0148806 A1 | * | 6/2008 | Bell | 73/1.37 |
| 2008/0282789 A1 | * | 11/2008 | Regis et al. | 73/146 |

FOREIGN PATENT DOCUMENTS

WO    9421502    9/1994

OTHER PUBLICATIONS

UK; Preliminary Exam Report received May 10, 2010 in Application No. 1004971.6.
UK; Search Report dated Jul. 28, 2010 in Application No. 1004971.6.

* cited by examiner

*Primary Examiner* — Rami Khatib
(74) *Attorney, Agent, or Firm* — Snell & Wilmer L.L.P.

(57) ABSTRACT

A system, apparatus and method provide a means for testing operation of a vehicle brake system. More particularly, a brake controller for controlling operation of the brake system includes a signal generator that can generate data indicative of wheel speed. Based on a user command, the controller uses either actual wheel speed data or simulated wheel speed data as inputs for controlling brake operation. The controller also includes logic for exercising various braking functions so as to enable maintenance personal to determine operational systems of the brake system.

2 Claims, 4 Drawing Sheets

AUTOBRAKE AND DECEL CONTROL BUILT-IN TEST EQUIPMENT

FIELD OF THE INVENTION

The present invention relates generally to brakes and, more particularly, to a method, apparatus, and system for controlling brakes of a vehicle.

BACKGROUND

Autobrake brake control systems have been in widespread use for many years. Such systems enable a vehicle, such as an aircraft, to be quickly and safely brought to a stop. More particularly, autobrake functionality allows a pilot to select from several automatic deceleration levels for landing, or to arm a rejected take off (RTO) setting prior to takeoff. During autobraking, pressure is automatically applied to the brakes independent of the pilot's brake pedals. In multiwheel vehicles, the same pressure is usually applied to all the wheels. The system regulates brake pressure to compensate for various effects, such as aircraft drag, thrust reversers, and spoilers, to maintain the selected deceleration level. A typical autobrake system has at least three levels of deceleration: low, medium, and maximum. Depending on the selected level of deceleration, the plane will automatically decelerate after landing based on the selected deceleration level.

To implement autobraking functionality, autobrake control systems rely on velocity data to determine a deceleration rate of the vehicle. Typically, this data is at least partially derived from wheel speed sensors operatively coupled to corresponding wheels. The data from the wheel speed sensors is provided to a brake system control unit (BSCU) and based thereon, the vehicle velocity and deceleration rate is determined. Application of the brakes then is controlled by the BSCU so as achieve autobrake control.

As is the case with many components of a vehicle, periodic maintenance is performed on the autobrake control system to ensure proper operation and to repair and/or replace system components, if needed. Preferably, such maintenance includes exercising the respective functions in real-world conditions while in a controlled environment, such as an aircraft hanger or maintenance bay. However, since autobrake control utilizes vehicle speed data to implement the respective control routines, such data is difficult to obtain while the vehicle is undergoing maintenance (e.g., while in a hanger or maintenance bay). Thus, performing real-world tests on the autobrake system can be difficult.

SUMMARY OF INVENTION

The present invention provides a system, apparatus and method in including built-in test equipment (BITE) that enables a vehicle's autobrake system to be tested while the vehicle in undergoing maintenance (e.g., while the vehicle is in a hanger or maintenance bay). The BITE includes a signal generator that simulates data from wheel speed sensors, thereby enabling tests to be performed on the autobrake system without the need to actually move the vehicle or alter wiring of the system. The signal generator can be implemented in either hardware or software, and can be electronically enabled, for example, via a maintenance terminal, switches (e.g., DIP switches or the like) or hardware connections at a maintenance terminal. Once enabled, the signal generator output can be electronically switched in place of the actual wheel speed sensors so as to simulate wheel speed data. This data then can be used to exercise functions of the autobrake system. The simulated data may be raw data (e.g., the same type of data output by the wheel speed sensors, such as pulses, for example), or it may be processed data (e.g., scaled wheel speed).

Further, the BITE also can include logic for simulating and/or manipulating various sensor and switch data, such as weight-on-wheels (WOW), autobrake switch settings such as minimum (MIN), medium (MED) and maximum (MAX) deceleration, rejected takeoff (RTO), disabled (OFF), etc. For example, when the BITE is enabled, a maintenance technician, via a maintenance terminal, can electronically command sensor data to toggle from one state (e.g., TRUE) to another state (e.g., FALSE), thereby simulating aircraft operations. Alternatively, instead of using a maintenance terminal to manipulate the state of sensors, the technician may manipulate the actual sensors (e.g., via electrical jumper connections, or by manipulating the switches in the cockpit, for example).

The BITE also may include logic that responds to certain events (e.g., the logic may simulate an actual touchdown of an aircraft based on the state of various sensors). For example, if, during test mode, the WOW sensor is reporting that weight is not on the wheels, then the signal generator may output data corresponding to zero wheel speed. Upon the WOW sensor reporting that weight is on wheels, the signal generator may automatically output a signal corresponding to high wheel speed, and then decrease the signal so as to approximate deceleration of the vehicle (e.g., typical touchdown speed of an aircraft). This simulates the landing process of an aircraft, and can be used to monitor and evaluate events and conditions of the autobrake system, thereby providing the technician with accurate view of how the system will operate in normal use.

According to one aspect of the invention, a method and device for providing a test mode for testing operation of a vehicle brake system can be configured to receive data indicative of actual speed of at least one wheel of the vehicle, and to generate simulated wheel speed data for the at least one wheel. The actual wheel speed data is used as a control parameter while in a first mode (e.g., normal operations), and the simulated wheel speed data is used as a control parameter while in a second mode (e.g., while in test mode).

Preferably, the device includes a first input for receiving the data indicative of actual speed of the at least one wheel, a second input for receiving a command indicative of test mode, and an output for providing the wheel speed data to a brake controller or control system. Further, the device can include a signal generator configured to generate the simulated wheel speed data, wherein the signal generator can provide a processed wheel speed signal or a raw wheel speed signal. Also, the signal generator can be implemented in software or hardware of the device.

Preferably, test logic is provided to exercise functions of the brake system. This can be implemented, for example, by causing the generated wheel speed data to be responsive to a status of the vehicle (simulated or actual status data). For example, to simulate aircraft touchdown, the generated wheel speed data can be indicative of a first wheel speed when a status indicator is indicative of the vehicle not being on the ground, and the generated wheel speed data can be indicative of a second wheel speed when the status indicator is indicative of the vehicle being on the ground, wherein the second wheel speed is greater than the first wheel speed. The generated wheel speed data then can be decreased from the second wheel speed toward the first wheel speed after determining the vehicle is on the ground so as to simulate vehicle deceleration.

Further, a status of the brake system can be monitored and recorded as the simulated wheel speed is varied. The status of the brake system can be compared to a predetermined range of acceptable status values, and a message indicative of the results of the comparison can be generated. Additionally, both software functions of the brake controller and hardware actions of the brake system can be monitored.

Preferably, the above functionality is implemented within a brake system control unit (BSCU), although it is also possible to implement at least part of the functionality in a device separate from the BSCU. This is advantageous for retrofitting existing brake systems with the features described herein.

According to another aspect of the invention, a brake system for controlling braking operations of a vehicle includes the device for testing operation of the brakes, and the BSCU operatively coupled to the device. Further, the system can include wheel speed sensors and the brakes corresponding to each wheel.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

Figure 1:
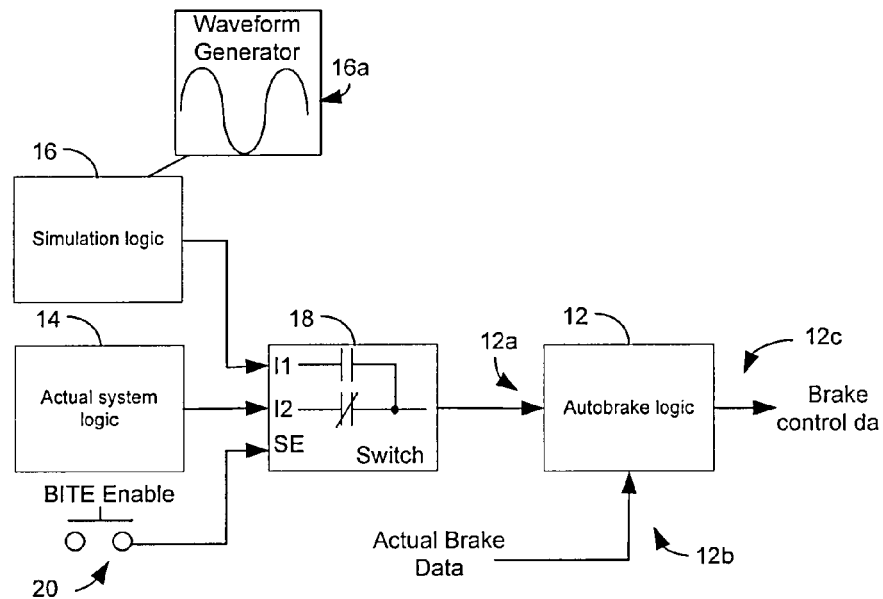
FIG. 1 is a simple schematic diagram illustrating an exemplary logic flow in accordance with the present invention.

The principles of the invention will now be described with reference to the drawings. Because the invention was conceived and developed for use in an aircraft braking system, it will be herein described chiefly in this context. However, the principles of the invention in their broader aspects can be adapted to other types of autobraking systems.

The present invention provides a system, apparatus and method that allow maintenance personnel to quickly and easily test operation of a vehicle's brake system. More particularly, a means for generating a simulated wheel speed signal and for switching the simulated wheel speed signal in place of data from wheel speed sensors is provided. This enables a maintenance technician to exercise the autobrake system functions without having to monitor the system during an actual landing. Not only does this significantly simplify maintenance operations for the technician, but it also minimizes costs as the aircraft does not need to perform actual landings.

In addition to the above, the system, apparatus and method in accordance with the present invention include and/or utilize discrete signal transitions (weight-on-wheels, gear downlock, etc.), as well as analog and/or digital signals corresponding to wheel speed (speeds typical at touchdown, spin up, deceleration due to braking, etc.), pilot pedal deflections, or other parameters as required to enable simulation of actual braking events. Preferably, the actual simulation is compressed relative to actual landing events to minimize the length time required to perform the simulation.

For example, the brake control system of an aircraft is a collection of sub-systems, including a brake control unit (BSCU), a brake control algorithm (BCA) executed by the BSCU, brake control valves (BCV), hydraulic lines, brakes, pressure sensors, etc. The output signals and their corresponding envelope include signals between the subsystems starting with the BCA and moving toward each wheel's brake. By monitoring these signals in a controlled test environment, maintenance personnel can exercise the brake system functions (without the need to actually land the aircraft) and diagnose potentially underperforming sub-systems.

For example, assume input signals are applied to the BCA and the first key output signal from the BCA is the brake command output signal. If this signal remains within its expected envelope, then the BCA is likely healthy. The BCA brake command signal is the input to electronic hardware that produces a BCV current fro driving the BCV. If this BCV current is within its expected envelope, then it is likely that the electronic hardware for generating the BCV current is healthy. This process can continue down each list of sub-systems for all braked aircraft wheels. Should a sub-system not perform within its expected envelope, a flag can be generated that points to the underperforming sub-system.

Additionally, the test results can be stored in memory for use at a later time. For example, previous test results can be compared to establish a trend for the output signals. This feature could help support preventative maintenance of the brake system.

Referring initially to FIG. 1, there is shown a simple schematic diagram 10 illustrating exemplary features of a system, device and method in accordance with the invention. More specifically, autobrake logic 12 performs autobraking functions, such as deceleration controlled stopping, rejected take-off braking, etc. It should be understood that for sake of clarity, only single inputs are shown for each of the first and second inputs 12a and 12b, and only a single output is shown for the first output 12c. In an actual implementation, there may be multiple inputs and outputs for each of inputs 12a, 12b and output 12c of the autobrake logic 12.

As is conventional, the autobrake logic 12 receives data, such as wheel speed data, autobrake configuration data, system status data, etc., at first input(s) 12a and braking data, such as force applied by the brakes, ram position, brake pressure, etc., at second input(s) 12b. The autobrake logic uses the received data to calculate a brake command signal, which is provided at first output(s) 12c. More specifically, the autobrake logic 12 determines a desired deceleration rate (e.g., based on user settings), calculates deceleration rates for each wheel, and then varies the brake command signal corresponding to each wheel so as to achieve a desired result, such as decelerate the wheel at the desired deceleration rate. In response to the brake command signal, each brake increases or decreases an applied brake force to correspond with the brake command signal, thereby affecting the deceleration rate of the wheel.

System data, such as wheel speed data, system configuration data, and system status data, is provided to the autobrake logic 12 via actual system logic 14, simulation logic 16 and switch 18. Actual data (e.g., actual data as measured by sensors and/or provided by switches on the vehicle) is provided by the actual system logic 14, and simulation data (e.g., data that simulates the actual data) is provided by the simulation logic 16. The switch 18 acts as a selector to select either simulation data or actual data for use by the autobrake logic 12.

Actual wheel speed data typically is provided by wheel speed sensors that are operatively coupled to each wheel of the vehicle. As the wheel rotates, the corresponding wheel speed sensor provides data indicative of the angular velocity of the wheel. Actual system status data includes vehicle information monitored by various sensors and switches on the vehicle and can include, for example, weight-on-wheels, landing gear position, brake temperature, etc. Actual system configuration data includes user settings as entered via user input devices, such as switches, touch screens, etc. and can include the desired deceleration rate (e.g., minimum, medium, maximum), or any other data used to configure the autobrake system.

Simulated wheel speed data is provided by the simulation logic 16, which includes logic and/or circuitry, such as a signal generator 16a, for simulating wheel speed data. Such signal generator can be implemented in hardware or software, and may utilize standard or custom waveforms. Custom waveforms may be useful for testing specific scenarios, landing on slick surfaces, slow actuator response, etc. One having ordinary skill in the art would readily appreciate which waveforms may be used to exercise specific features and simulate specific conditions and, therefore, specific waveforms are not discussed herein. Signal generators are well known in the art and, therefore, will not be described in detail herein. In one embodiment, the signal generator is configured to provide data in the same for as the wheel speed sensors. For example, if the wheel speed sensors are encoders that provide a pulse-train output, then the signal generator can be configured to provide a pulse-train output. In this embodiment, switching between the actual wheel speed data and the simulated wheel speed data would occur prior to any signal conditioning/scaling that is performed on the wheel speed data. In another embodiment, the signal generator is configured to provide processed wheel speed data (e.g., scaled data, such as wheel speed in radians per second). In this embodiment, switching between the actual wheel speed data and the simulated wheel speed data would occur subsequent to any signal processing/scaling circuitry.

The simulation logic 16 also may include logic that automatically sequences events so as to simulate autobrake functionality. For example, the simulation logic 16 may initially instruct the signal generator 16a to output data indicative of zero wheel speed while the weight-on-wheels sensor (not shown in FIG. 1) indicates no weight on the wheels (e.g., the aircraft has not landed). Upon toggling the state of the weight-on-wheels sensor, the simulation logic 16 may command the signal generator 16a to output a high wheel speed (thereby simulating initial touchdown of the aircraft and the corresponding high wheel speed at touchdown) and then gradually decrease the wheel speed (in accordance with the selected deceleration rate, e.g., MIN, MED, MAX) so as to simulate deceleration of the aircraft. As described in more detail below, such simulation can be used to test operation of the autobrake system.

The output of the actual system logic 14 and the simulation logic 16 are provided to respective inputs of switch 18, which may be a hardware switch or a software switch. Further, an enable input 20 is operatively coupled to a select input of switch 18. The enable input may be generated from an electrical signal (e.g., via a selector switch, dip switch, or the like), or via a software generated command (e.g., via a computer terminal operatively coupled to the switch 18). Based on the state of the enable input 20, the switch 18 will couple either the actual system logic 14 or the simulation logic 16 to the autobrake logic 12. In this manner, maintenance personnel can easily inject wheel speed data without the aircraft performing actual landing operations.

Figure 2:
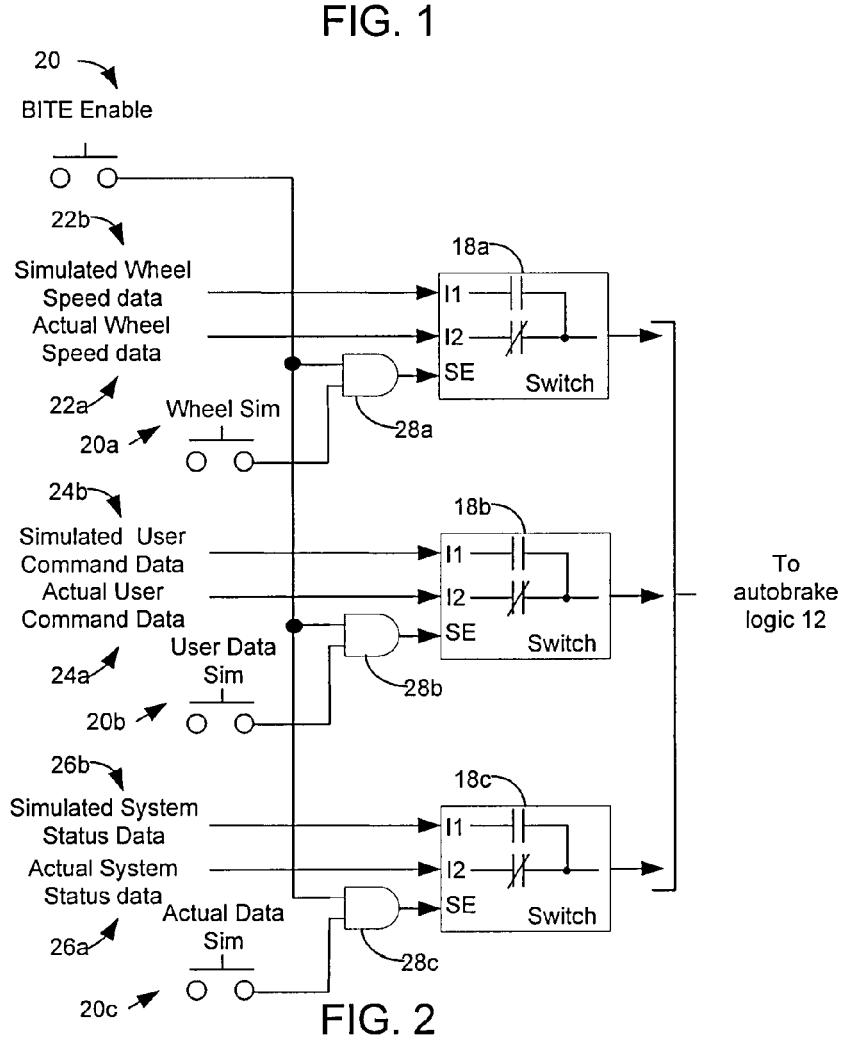
FIG. 2 is a schematic diagram illustrating the selection of various test parameters in accordance with the invention.

With further reference to FIG. 2, the data provided to the autobrake logic 12 may be selected based on a plurality of different criteria. For example, there may be a general enable input, such as the enable input 20 described above, that can be used as a master enable input. When the master enable input 20 is in the disabled state (e.g., logic low), the autobrake system operates in a normal manner (i.e., the actual system logic 14 is provided to the autobrake logic 12). However, when the master enable input 20 is in the enabled state (e.g., logic high), then the simulation logic 16 is armed, and the data provided to the autobrake logic 12 is further based on several other selectable inputs.

More particularly, an enable input may be provided for each type of data that is communicated to the autobrake logic 12. After the simulation logic 14 has been armed via the master enable input 20, the user may individually select (e.g., via additional software or hardware switches) which simulated or actual data is provided to the autobrake logic 12. For example, the user can choose between several different test configurations, such as whether or not to provide actual wheel speed data 22a (e.g., from wheel speed sensors) or simulated wheel speed data 22b (e.g., from the signal generator 16a), actual system feedback 24a (e.g., actual status from sensors and switches on the vehicle, such as WOW sensor, landing gear position sensor, etc., that monitor system status) or simulated system status 24b (e.g., user generated representations of the system feedback, which may be entered via a computer terminal), and actual system configuration data 26a (e.g., actual user settings from cockpit input devices, such as the type of deceleration control) or simulated configuration data 26b (e.g., user generated representations of the system configuration data, which also may be entered via a computer terminal).

To select the particular test configuration, individual enable inputs 20a, 20b and 20c may be provided for each type of data. Each enable input 20a, 20b and 20c can be provided to a corresponding AND gate 28a, 28b and 28c. Also provided to each AND gate 28a, 28b and 28c is the master enable 20. Thus, if the master enable 20 is in the disabled state (e.g., logic low), the output of each AND gate 28a, 28b and 28c is also low, thereby causing input 2 of each switch 18a, 18b and 18c to be provided to the autobrake logic 12. However, if the master enable input 20 is enabled (e.g., logic high), then the output of each AND gate 28a, 28b and 28c is dependent on the status of the corresponding enable input 20a, 20b and 20c. This provides the user with the option of various test configurations, which can facilitate testing of the autobrake system. Again, although only three different data types are shown in FIG. 2, it is to be understood that the system can be configured with more or fewer data types as desired for the particular application.

Figure 3:
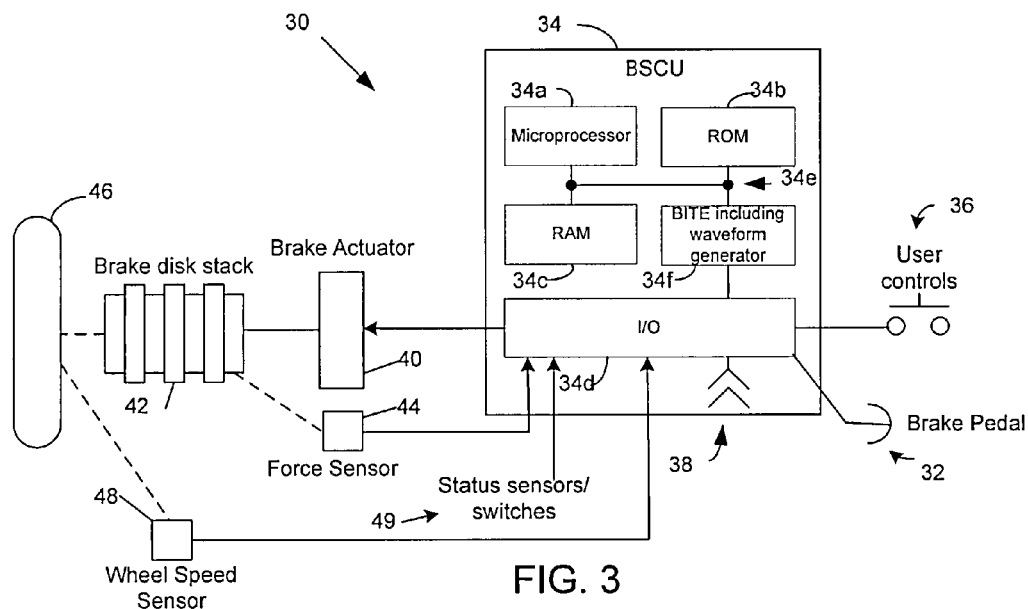
FIG. 3 is a schematic diagram of an exemplary brake control system in accordance with the present invention.

Referring to FIG. 3, a schematic diagram of an exemplary aircraft brake control system 30 in accordance with the invention is shown. The system 30 includes a brake pedal 32 that generates a reference signal proportional to an amount of pedal deflection or desired braking level. The reference signal generated by the brake pedal 32 is provided to a brake controller 34, which also receives data relating to the wheels and brakes (e.g., wheel speed, brake torque, brake temperature, etc. from sensors discussed below). Also provided to the brake controller are system configuration controls 36, such as controls for configuring the autobraking system (e.g., minimum deceleration, medium deceleration, maximum deceleration, rejected take-off, etc.). The controls 36 may be switches or the like that provide electrical signals to the controller 34 (e.g., via contact closure). Alternatively, the controls 36 may be input via computer display (e.g., a touch screen).

The brake controller 34 can include a microprocessor 34a, read only memory (ROM) 34b, random access memory (RAM) 34c, and input/output module 34d, each of which are communicatively coupled via a system bus 34e or the like. A braking program can reside in ROM 34b and can be executed by the microprocessor 34a so as to implement a braking function. Further, the controller 34 includes BITE logic 34f that carries out the autobrake testing features described herein. The BITE logic 34f, which can include the waveform generator, may be embodied as computer executable code and stored in ROM (e.g., in ROM 34b or in a separate ROM), or it may be embodied as logic circuitry (e.g., in hardware, such as an ASIC). The controller 34 also can include a communication port 38 operatively coupled to the I/O module 34d. The port 38 can be a conventional communication port configured to enable a maintenance terminal, such as a computer or the like, to communicate with and/or manipulate the BITE logic 34f so as to achieve a desired result, e.g., to configure the BITE logic 34f and/or to monitor data from the BITE logic and/or the brake controller 34.

The brake controller 34 is operatively coupled to a brake actuator 40, such as one or more hydraulic valves, electric motors, or the like, which in turn apply a force to a brake disk stack 42. Based on a braking reference from the pedal 32 and data relating to the wheel and brakes, the braking controller 34 provides a brake command to the brake actuator 40. The actuator 40, in response to the brake command, applies a braking force to a brake disk stack 42, and the force is measured by a force transducer 44 and provided to the brake controller 34. The braking force applied to the brake disk stack 42 converts kinetic energy to heat energy, which causes wheel 46 coupled to the brake disk stack 42 to decelerate. A wheel speed sensor 48 monitors the angular velocity of the wheel 46, and provides the data to the brake controller 34. Also provided to the controller 34 are status sensors/switches 49 that provide information regarding current states of the vehicle, such as weight-on-wheels, etc. The brake controller 34, in response to the force and/or wheel speed data, varies the brake command to achieve the desired brake pressure or deceleration rate.

Figure 4:
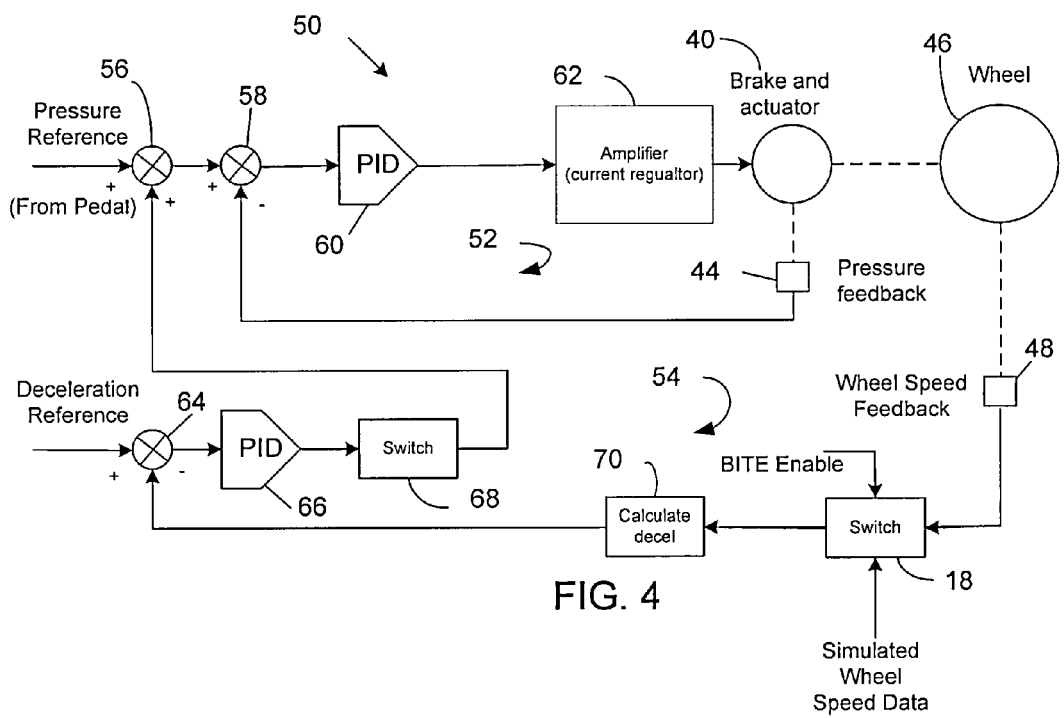
FIG. 4 is a flow diagram illustrating an exemplary control loop in accordance with the present invention that may be implemented by the brake controller shown in FIG. 3.

Referring now to FIG. 4, there is shown an exemplary brake control loop 50 that interfaces with the BITE logic 34f in accordance with the present invention. The exemplary brake control loop 50 includes an inner loop 52, and an outer loop 54. Beginning with the inner control loop 52, a reference signal from a brake command device, such as the brake pedal 32, is provided to a first summing junction 56. The first summing junction 56 also receives a trim signal from the outer control loop 54 to implement deceleration controlled braking, and is described below. A second summing junction 58 receives the output from the first summing junction 56, and also receives a force feedback signal from force transducer 44. The second summing junction 58 generates and error signal, which is provided to controller 60, such as a PID controller or the like, which in turn provides a current reference signal to an amplifier 62. The amplifier 62 converts the current reference signal into a power signal which is provided to the brake actuator 40 so as to provide a braking force to the brake disk stack and thus the wheel 46. The force provided by the actuator 40 is measured by force transducer 44, and the measured force is communicated to the second summing junction 58 so as to close the inner loop 52. It is noted that instead of using actual force to close the control loop, the actual pressure (e.g., hydraulic pressure in a hydraulic brake system) and/or the position of the brake rams may be used, provided they are properly scaled to the reference signal.

The outer control loop 54 may be placed around the inner control loop 52 so as to "trim" the brake force or pressure reference signal to regulate another parameter, such as a deceleration rate of the wheels. For example, the trim signal may effectively increase or decrease the reference signal in an attempt to regulate wheel deceleration.

The outer control loop 54 includes a third summing junction 64, which receives the reference deceleration reference signal, e.g., from a potentiometer or a thumbwheel switch located in the cockpit). An output of the third summing junction 64 is provided to controller 66, e.g., a PID or other controller, and the output of the controller is provided to a switch 68. The output of the switch 68 is provided to the input of the first summing junction 56 of the inner control loop 52. The switch provides a means for enabling or disabling the outer control loop 54 (e.g., to turn on or off deceleration control).

Data indicative of wheel speed is collected by wheel speed sensor 48, and this data is provided to switch 18. Switch 18 also receives simulated wheel speed data from signal generator 16a. Based on the status of the enable switch (and/or on the status of switch 20 and 20a), either actual wheel speed data or simulated wheel speed data is output by the switch and provided to the calculation block 70. The calculation block then calculates a deceleration rate of the wheels and provides the calculated deceleration rate to the third summing junction 64 to close the outer loop and regulate wheel deceleration.

Thus, the switch 18 provides a convenient means in which to inject test wheel speed signals into the control loop 50 and to monitor its operation, as well as the operation of the brake hardware components. More specifically, various simulated wheel speed data can be injected into the control loop 50, and a maintenance technician can monitor the operation of the autobrake function.

It is noted that while the BITE logic 34f is shown as part of the brake controller 34, the BITE logic 34f may be external from the brake controller. For example, the BITE logic can be stored in and executed by a separate maintenance controller. In such an embodiment, the system data (e.g., wheel speed data, configuration data and status data) may be provided to the maintenance controller, which performs the simulation and switching functions described herein. The outputs of the maintenance controller then can be coupled to the inputs of a conventional brake controller. This embodiment may be useful for retrofitting existing brake systems, for example.

Figure 5:
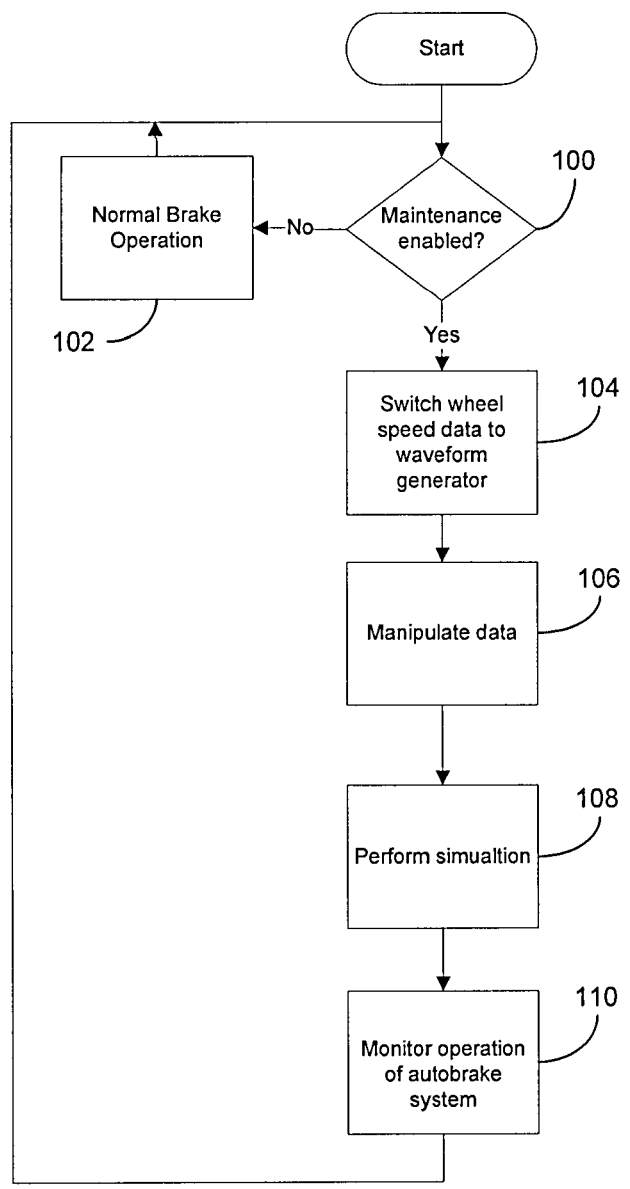
FIG. 5 is a flow chart illustrating exemplary steps for implementing the simulation logic in accordance with the invention.

With additional reference to FIG. 5, illustrated are logical operations to implement an exemplary method for testing operation of a vehicle brake system in accordance with the present invention. The flow chart of FIG. 5 may be thought of as depicting steps of a method carried out by the brake controller 34 or s separate controller. Although FIG. 5 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning with block 100, it is determined if the maintenance mode is enabled. This can be determined, for example, based on the status of an enable input device 20, such as a selector switch, DIP switch, etc. The enable input device 20 can be operatively coupled to the controller 34, which in turn monitors a status of the input device 20. If maintenance mode is not enabled, then at block 102 normal brake operations are performed, and the method moves back to block 100. If maintenance mode is enabled, then at block 104, simulated wheel speed data is switched in place of actual wheel speed data. More particularly, a hardware or software switch removes the actual wheel speed data from the autobrake logic 12, and operatively couples the simulated wheel speed data to the autobrake logic 12.

Next at block 106, data used by the autobrake system is configured or manipulated to achieve a desired result. For example, control parameters that determine a particular configuration of the autobrake system, such as the deceleration rate, rejected take-off, etc. are configured. These parameters may be configured using the actual controls in the vehicle (e.g., the controls in the cockpit of the aircraft). Alternatively, the control parameters may be set via a maintenance terminal, such as a laptop computer, for example, that is communicatively coupled to the brake controller 34. Via software control, parameters can be set and/or overridden from the maintenance terminal.

In addition to control parameters, status parameter also may be set or manipulated. The status parameters include data obtained from sensors on the vehicle, and can include sensors related to weight on the wheels, landing gear position, etc. These status parameters, like the control parameters above, also be can set by physically manipulating the corresponding switch (e.g., jumpering an electrical connection of the sensor or switch), or via software control from the maintenance terminal.

At block 108, simulation of the autobrake system is performed, wherein simulated wheel speed data is provided to the autobrake logic 12, and at block 110 the simulation data is monitored and/or recorded. Additionally, logic may be executed to simulate a sequence of events that occur, for example, during landing of an aircraft, a rejected take-off, etc. For example, logic may be executed that simulates landing of an aircraft on normal or slick runways, rejected take-offs, landings with heavy loads, etc. The logic may sequence particular status parameters and change simulated wheel speed to make it appear to the autobrake system that an event, such as a landing, is occurring.

For example, in a simulated landing sequence, the logic may initially set the simulated wheel speed to zero, the landing gear extended to false, and the weight-on-wheels to false. In a second sequence, the logic may change the landing gear extended to true, and maintain the weight-on-wheels false and the wheel speed at zero. In a third sequence, the logic may change the weight-on-wheels to true, and then set the wheel speed to a first value (e.g., a high wheel speed typically encountered during landing). In a fourth sequence, the logic may decrease the wheel speed from the first value to a second value, thereby simulating deceleration of the aircraft.

One possible simulation is described below. However, it should be appreciated that there are a number of different possible simulations that can be carried out depending on the desired event being simulated.

An exemplary simulation will be described with reference to FIG. 4. Initially, it is assumed that the vehicle's autobrake system is enabled and placed in test mode. Simulated wheel speed data is provided to the switch 18, and switch 18 is enabled so as to inject simulated speed into the loop. During simulation, the control loop 50 will attempt to control the brakes based on the simulated signals.

If the simulated deceleration rate is too high, the control loop 50, via the brake command output, will command a lower brake force in an attempt to decrease the deceleration. This is true for each independently controlled wheel. If the simulated deceleration rate is equal to the commanded deceleration rate, then no correction is required and the commanded brake force will be maintained. If the simulated deceleration rate is too low, the commanded brake force is increased in an attempt to increase the deceleration. During this entire simulation process, the maintenance technician can monitor both software and hardware functionality to ensure proper operation.

Figure 6:
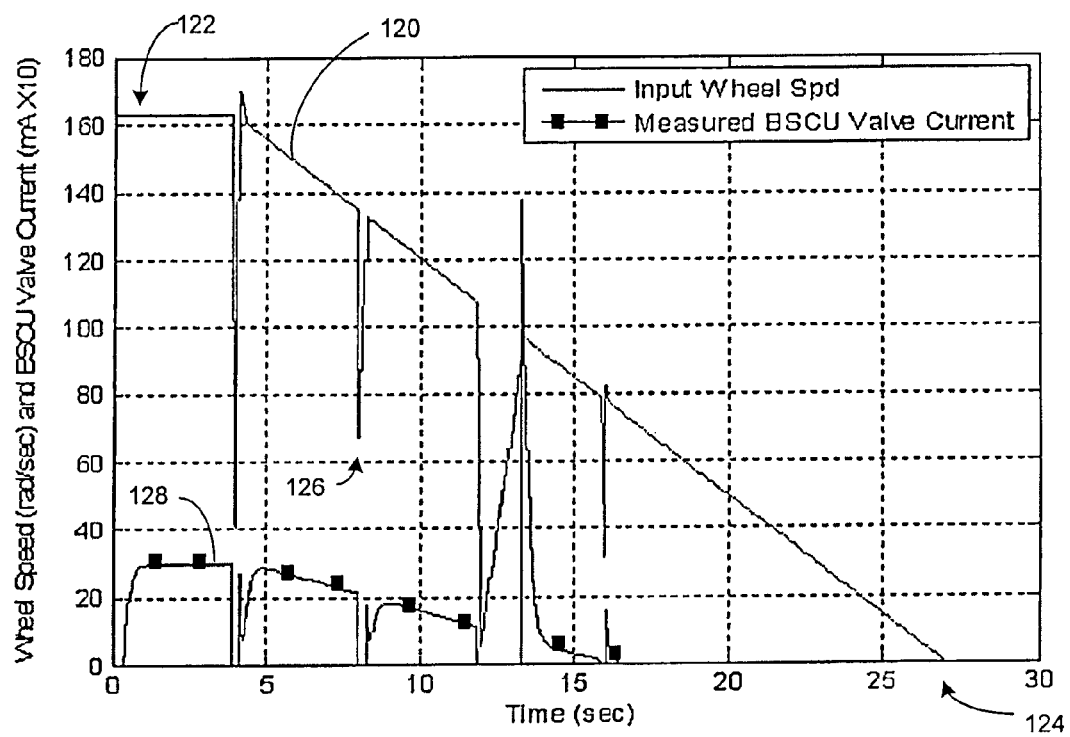
FIGS. 6 and 7 are exemplary graphs showing simulated wheel speed data and brake controller output response in accordance with the present invention.

For example, FIG. 6 is an exemplary graph showing simulated wheel speed data 120 and a brake controller's response to the changes in the simulated wheel speed data. As shown in FIG. 6, the wheel speed data starts at an initial high value 122 and then gradually decreases toward zero wheel speed 124. As the simulated wheel speed data decreases, dips or notches 126 are introduced to simulate a wheel skid condition. In response to the simulated wheel speed, the brake controller 34 generates a brake command signal 128 in an attempt to control the deceleration of the vehicle. Further, in response to the dips 126 in the simulated wheel speed, the brake controller drives the brake command signal toward zero output in an attempt to stop the pseudo skid. Such operation provides valuable information to a technician who is troubleshooting operation of the brake system.

Figure 7:
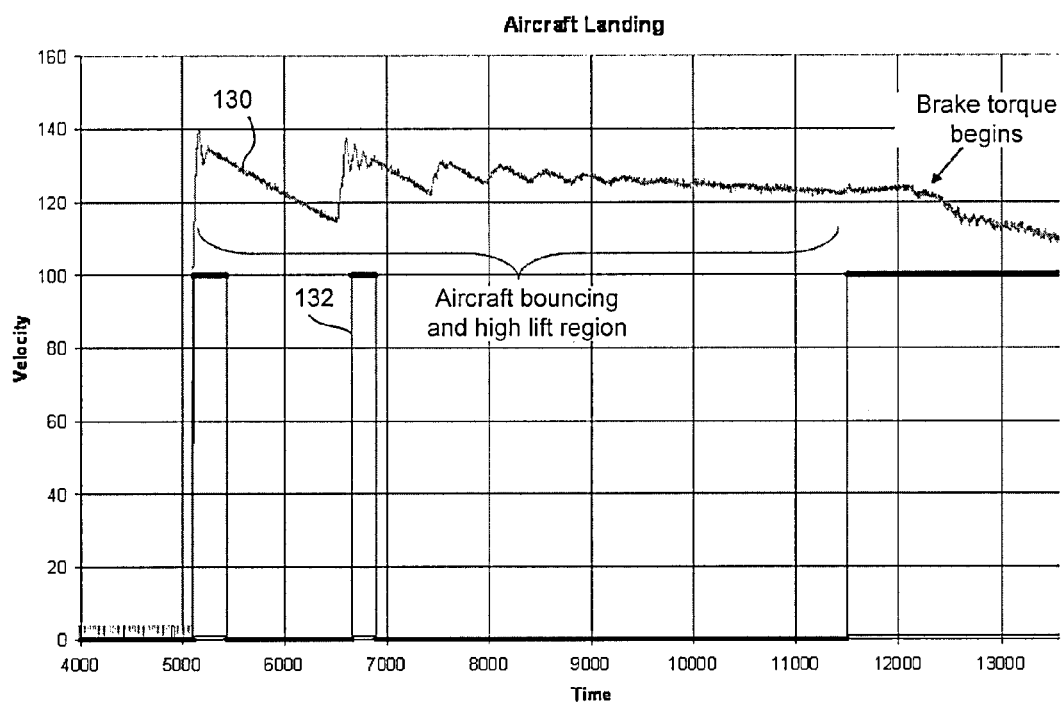

FIG. 7 is another exemplary graph showing wheel speed data 130 and the weight-on-wheels data 132 for a simulated landing sequence. Initially, the aircraft has not touched down and thus wheel speed is about zero, while the WOW sensor is false (indicating no weight on the wheels). At some time later, an initial landing sequence is simulated, wherein wheel speed is ramped up to a predetermined speed to simulate wheel spin up. Also, the WOW sensor toggles from false to true, thereby indicating there is weight on the wheels. As is typical during aircraft landing, the aircraft may bounce several times before completely touching down. This is simulated by toggling the WOW sensor from true to false several times (the actual number of bounces and thus the number of times the WOW sensor toggles can be specified by the user). Further, to correspond with the bouncing, wheel speed can be ramped toward zero while the WOW sensor is false and ramped back up while the WOW sensor is true. As will be appreciated, the ramp up and ramp down rates can be different from one another and/or may be set by the user. At some time later, the aircraft settles (i.e., stops bouncing) and a braking torque is applied to the wheels, which results in the wheel speed decreasing toward zero speed.

Various wheel speed profiles may be stored in the BITE logic 34*f*, such as profiles corresponding to dry, wet or snow-covered surface conditions, different deceleration rates, different skid types, etc. The profiles may also correspond to various landing and take-off scenarios (e.g., rejected take-off). The various profiles stored in or loaded to the BSCU allow for simpler on-board testing (potentially even available to pilots prior to landing). This would allow the pilots to assess the brake control system in advance of an actual braking event. Further, the BITE logic may be configured to accept custom profiles as needed to achieve a desired excitation of software and/or hardware functions of the brake system. These custom profiles may be loaded via a maintenance terminal, for example.

In use, the technician can monitor software functions and, via output signal sensors, check hardware performance. Further, the software and hardware performance can be automatically checked by the brake controller 34. More particularly, the controller 34 can compare test output signals to stored data of acceptable values or ranges of acceptable performance. This can include the magnitude of signals as well as signal timing (e.g., signal timing relative to other signals or events). The controller 34 can report when one or more signals are not within the expected range, and this can be used by the technician to isolate a problem within the brake system.

Thus, the BITE logic 34*f* can be used to debug autobrake performance or deceleration brake performance by comparing variables internal to the controller 34, valve currents at controller outputs, and brake pressure sensor measurements, etc. with predetermined acceptable ranges for these parameters. Further, by observing the link between output current and pressure response, anomalies in the system can be isolated to originating within the controller 34, to specific hardware.

Accordingly, a brake controller, system, and method are provided that can simulate brake operations without the need to perform actual aircraft landings. This minimizes expenses incurred by the aircraft operator, as the costs associated with flying and landing the aircraft are no longer a factor.

A person having ordinary skill in the art of computer programming and applications of programming for computer systems would be able in view of the description provided herein to program the BSCU to operate and to carry out the functions described herein. Accordingly, details as to the specific programming code have been omitted for the sake of brevity. Also, while software in the memory or in some other memory of the BSCU may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements in accordance with the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for providing a test mode for testing an operation of a vehicle brake system that controls brakes based on deceleration, said vehicle brake system including at least one wheel speed sensor operatively coupled to a test device, the at least one wheel speed sensor configured to provide data indicative of actual wheel speed, the method comprising:
   controlling, by the vehicle brake system, the brakes using simulated wheel speed data to determine deceleration, wherein a signal generator produces the simulated wheel speed data for the at least one wheel, wherein causing the signal generator to provide simulated wheel speed data that is responsive to the status of the vehicle includes:
      determining if a sensor is providing a signal indicative of the vehicle being on the ground;
      causing the signal generator to output wheel speed data indicative of a first wheel speed in response to determining that the vehicle is not on the ground; and
      causing the signal generator to output wheel speed data indicative of a second wheel speed in response to determining that the vehicle is on the ground, wherein the second wheel speed is greater than the first wheel speed,
   wherein the brake system is an autobrake system;
   injecting, at a first switch, the simulated wheel speed data,
   calculating, by the vehicle brake system, a deceleration value based upon the simulated wheel speed data,
   receiving, by the vehicle brake system, brake pressure from a sensor; and
   verifying, by the vehicle brake system, the brake pressure.

2. The method according to claim 1, further comprising monitoring at least one of software functions of a brake system control unit (BSCU) or hardware actions of the brake system.

* * * * *